United States Patent Office 3,184,468
Patented May 18, 1965

3,184,468
2,5-DI-[1',3',4'-OXDIAZOL-2-YL]THIOPHENE COMPOUNDS
Adolf Emil Siegrist and Leonardo Guglielmetti, Basel, Erwin Maeder, Munchenstein, and Peter Liechti, Binningen, Switzerland, assignors to Ciba Limited, Basel, Switzerland, a company of Switzerland
No Drawing. Filed Apr. 23, 1963, Ser. No. 274,948
Claims priority, application Switzerland, May 4, 1962,
5,338/62
5 Claims. (Cl. 260—307)

The present invention provides new 2:5-di-[1':3':4'-oxdiazolyl-(2')]-thiophene compounds corresponding to the formula (1) 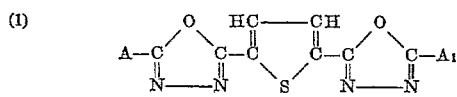

where A and $A_1$ are identical or different and each represents a monocyclic radical of aromatic character, for example a pyridine, furan or thiophene radical, and more especially a benzene radical.

The symmetrical compounds of the Formula 1 are obtained by treating an acylhydrazine of the formula (2) 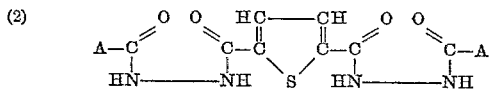

where the two A's represent identical radicals of the kind defined above—with an agent capable of eliminating water.

The symmetrical acylhydrazines of the Formula 2, in their turn, are obtained by reacting thiophene-2:5-dicarboxylic acid dihydrazide of the formula (3) 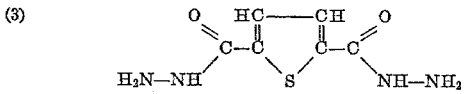

in the molecular ratio of 1:2 with a monocarboxylic acid chloride of the formula (4)  A—CO—Cl or by reacting thiophene-2:5-dicarboxylic acid dichloride of the formula (5) 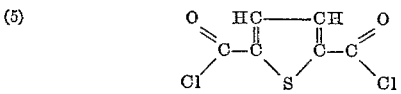

with a monocarboxylic acid hydrazide of the formula (6)  A—CO—NH—$NH_2$

The radical A in the monocarboxylic acid derivatives of the kind defined above is a monocyclic radical of aromatic character, for example, a pyridine, furan or thiophene radical, and more especially a benzene radical. In the latter case preferred use is made of chlorides or hydrazides of benzenemonocarboxylic acids of the formula (7) 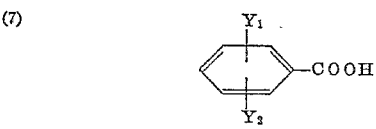

where $Y_1$ stands for a hydrogen or chlorine atom or for an alkyl or an alkoxy radical, and $Y_2$ for a hydrogen or chlorine atom or for an alkyl radical. The alkyl and alkoxy radicals contain with advantage 1 to 8 carbon atoms.

As examples of carboxylic acids of the formula A—COOH, whose halides or hydrazides are suitable as starting materials for the manufacture of the acylhydrazines of the Formula 2, there may be mentioned:

Benzenecarboxylic acids of the formula (8) 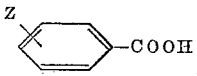

where Z stands for a hydrogen atom, an alkyl group with 1 to 8 carbon atoms, an alkoxy group with 1 to 8 carbon atoms, or a chlorine atom, such as:

2-, 3- or 4-methylbenzenecarboxylic acid,
2-, 3- or 4-chlorobenzenecarboxylic acid,
4-tertiary butylbenzenecarboxylic acid,
4-n-octylbenzenecarboxylic acid,
2:4-dimethylbenzenecarboxylic acid,
3:4-dimethylbenzenecarboxylic acid,
3:5-dimethylbenzenecarboxylic acid,
2:4-dichlorobenzenecarboxylic acid,
3:4-dichlorobenzenecarboxylic acid,
2-, 3- or 4-methoxybenzenecarboxylic acid,
2-, 3- or 4-ethoxybenzenecarboxylic acid,
2-methoxy-4- or 5-methylbenzenecarboxylic acid,
2-methoxy-5-chlorobenzenecarboxylic acid,
2-ethoxy-4-methylbenzenecarboxylic acid,
4-octylhydroxybenzencarboxylic acid,
Pyridine-2-, 3- or -4-carboxylic acid,
Furan-2-carboxylic acid.

Thiophenecarboxylic acids such as

Thiophene-2-carboxylic acid,
3- or 5-methylthiophene-2-carboxylic acid,
3:5-dimethylthiophene-2-carboxylic acid, and
Thiophene-2:5-dicarboxylic acid.

The reactions required in the manufacture of the symmetrical dioxdiazolyl-thiophene compounds of the Formula 1 and of the starting materials of the Formula 2 may be performed in the conventional manner. Thus, the reaction of the acid chlorides with the acid hydrazides is advantageously conducted in the presence of acid-binding agents, for example in a pyridine base, such as picoline or pyridine itself.

A very suitable agent capable of eliminating water for use in the conversion of the acylhydrazines of the Formula 2 into the symmetrical dioxdiazolyl-thiophene compounds of the Formula 1, is thionylchloride, inter alia, because it is possible to perform the cyclization in an excess of this water-eliminating agent (which, at the same time, acts as solvent), whereupon any unconsumed thionylchloride is easy to eliminate.

The asymmetrical dioxdiazolyl-thiophene compounds of the Formula 1—that is to say compounds in which A and $A_1$ differ from each other, each representing a monocyclic radical of aromatic character, for example a pyridine, furan or thiophene radical—or more especially a benzene residue—are obtained by treating a diacylhydrazine of the formula (9) 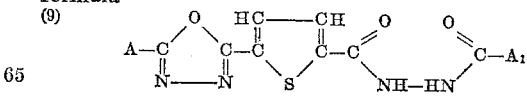

with an agent capable of eliminating water, more especially with thionylchloride.

To prepare the diacylhydrazines of the Formula 9, a monocarboxylic acid hydrazide of the formula (6)         A—CO—NH—NH$_2$ is reacted with thiophene-+2:5-dicarboxylic acid monomethyl ester chloride of the formula

(10) 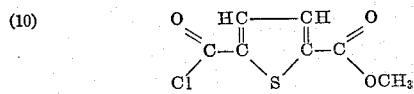

in the presence of an organic solvent, for example chlorobenzene; the resulting acylhydrazine of the formula

(11) 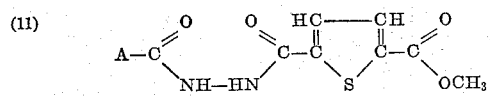

is treated with a water-eliminating agent, more especially with thionylchloride, optionally after first having been isolated; in the oxidazolyl-thiophene compound of the formula

(12) 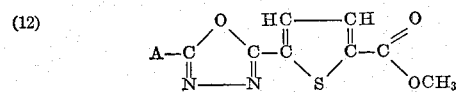

the carboxylic acid methyl ester group attached to the thiophene residue is converted into a carboxylic acid hydrazide group, and the monoacylhydrazine of the formula

(13) 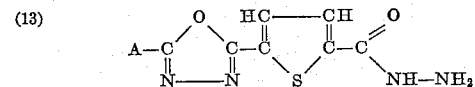

is condensed with a monocarboxylic acid chloride of the formula

(14)         A$_1$—CO—Cl where A$_1$ and A are different monocyclic radicals of aromatic character—to give the diacylhydrazine of the Formula 9. Monocarboxylic acid chlorides of the Formula 14 suitable for use in this process are those of the monocarboxylic acids mentioned above.

Of special value among the new 2:5-di-[1':3':4'-oxdiazolyl-(2')]-thiophene compounds of the Formula 1 are those of the formula

(15) 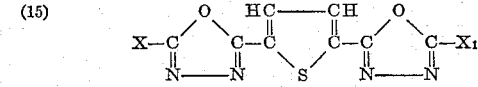

where X and X$_1$ are identical or different and each represents a group of the formula

(16) 

or a thiophene radical of the formula

(17) 

where Z represents a hydrogen atom or a carboxyl or carbomethoxy group—or a benzene radical of the formula

(18) 

where Y$_1$ stands for a hydrogen or chlorine atom or an alkyl or alkoxy radical which preferably contains 1 to 8 carbon atoms, and Y$_2$ stands for a hydrogen or chlorine atom or an alkyl group with up to 8 carbon atoms.

The new 2:5-di-[1':3':4'-oxdiazolyl - (2')] - thiophene compounds of the Formula 1 may be used for optically brightening a wide variety of organic materials. Particularly good brightening effects are obtained when these thiophene compounds are incorporated with materials from polyvinyl chloride, from polyolefins (such, for example, as polyethylene or polypropylene), from polyesters or from polyamides.

The new thiophene derivatives can be added to, or incorporated with, the materials to be treated before or during their shaping. Thus, in the manufacture of films, foils, tapes or mouldings they may be added to the moulding composition or they may be dissolved or finely dispersed in the spinning solution. The new thiophene derivatives may also be added before or during the polycondensation yielding, for example, polyamides or polyesters, to the reaction mixture, or before or during the polymerisation of monomers, for example vinyl chloride or acrylonitrile, to the polymerisation batch.

The amount of new thiophene compound to be used, calculated on the weight of the material to be optically brightened, may vary within wide limits. Even a very small amount—in certain cases, for example, as little as 0.01%—will produce a distinct and durable brightening effect. An amount of over 3% will, in general, not prove harmful, but it does not offer any advantage over the normal amount.

Unless otherwise indicated, parts and percentages in the following examples are by weight.

EXAMPLE 1

10.2 parts of the bis-diacylhydrazine of the formula

(19) 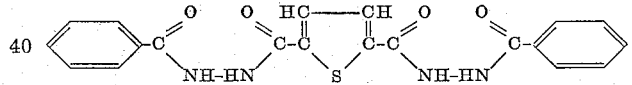

(obtained by reacting 2 molecular proportions of benzoyl chloride with 1 molecular proportion of thiophene-2:5-dicarboxylic acid dihydrazide in pyridine) in 150 parts by volume of thionyl chloride are heated within 30 minutes to the boil while being stirred, and the batch is then refluxed for 3 to 4 hours. When hydrochloric acid is no longer being evolved, the excess of thionyl chloride is removed by distillation from the clear, light-yellow reaction solution, initially under atmospheric pressure and finally under vacuum. The residue is triturated with water in a mortar, suction-filtered, washed with water and dried, to yield about 9.0 parts (=96.8% of the theoretical yield) of the thiophene compound of the formula

(20) 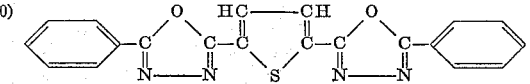

in the form of a light-yellow powder melting at 255 to 259° C. After three recrystallisations from dimethylformamide with the aid of active carbon, there are obtained almost colourless, very fine needles which display a strong pale-blue fluorescence in ultraviolet light and melt at 269–270° C.

Analysis.—C$_{20}$H$_{12}$O$_2$N$_4$S. Molecular weight: 372.41. Calculated: C, 64.50; H, 3.25; N, 15.04. Found: C, 64.31; H, 3.39; N, 14.81.

The following Table I lists further oxidiazolyl-thiophene compounds which are accessible by the process described above.

The compounds of the Formulae 22 to 34 are very suitable for optically brightening foils from, for example, polyvinyl chloride or polyethylene.

Table I

(21) 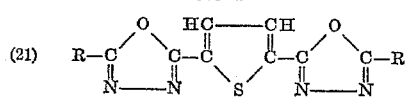

| No. | R = | Yield in percent | Description | Melts at °C. | Analysis Calculated (mols) | Found |
|---|---|---|---|---|---|---|
| 22 | ⌬–CH₃ (2-CH₃) | 94 | Pale-yellow, very fine, felted needles (dimethylformamide). | 270.5–272.5 | C: 65.98 H: 4.03 N: 13.99 (400.46) | C: 65.73 H: 3.98 N: 14.06 |
| 23 | ⌬–CH₃ (4-CH₃) | 99 | Almost colorless, very fine needles (dimethylformamide). | 275–276 | C: 65.98 H: 4.03 N: 13.99 (400.46) | C: 65.91 H: 4.07 N: 14.01 |
| 24 | 2,4-di-CH₃-phenyl | 88 | Pale-yellow, fine, shiny needles (dimethylformamide). | 236–237 | C: 67.27 H: 4.70 N: 13.07 (428.51) | C: 67.20 H: 4.89 N: 13.18 |
| 25 | 2,5-di-CH₃-phenyl | 98 | Pale-yellow, finely crystalline powder (dimethylformamide). | 259–260 | C: 67.27 H: 4.70 N: 13.07 (428.51) | C: 66.97 H: 4.83 N: 13.08 |
| 26 | 4-C(CH₃)₃-phenyl | 95 | Almost colorless, very fine needles (dimethylformamide). | 241–242 | C: 69.40 H: 5.82 N: 11.56 (484.62) | C: 69.10 H: 5.71 N: 11.60 |
| 27 | 4-OCH₃-phenyl | 71 | Light-yellow, very fine needles (dimethylformamide). | 264 | C: 61.10 H: 3.73 N: 12.96 (432.46) | C: 61.01 H: 3.68 N: 12.81 |
| 28 | 4-O(CH₂)₇–CH₃-phenyl | 81 | Light-yellow, very fine crystals (dioxane). | 240–241 | C: 68.76 H: 7.05 N: 8.91 (628.84) | C: 68.86 H: 6.95 N: 8.56 |
| 29 | 2-OCH₃-4-CH₃-phenyl | 94 | Light-yellow, very fine needles (dimethylformamide). | 235.5–236.5 | C: 62.60 H: 4.38 N: 12.17 (460.52) | C: 62.56 H: 4.12 N: 12.24 |
| 30 | 2-OCH₃-4-Cl-phenyl | 89.5 | Light-yellow, fine crystal powder (dimethylformamide). | 277–277.5 | C: 52.71 H: 2.82 N: 11.18 (501.28) | C: 52.70 H: 2.85 N: 10.90 |
| 31 | 2-Cl-phenyl | 89 | Pale-yellow, finely crystalline powder (dimethylformamide). | 195–195.5 | C: 54.44 H: 2.28 N: 12.70 (441.30) | C: 54.64 H: 2.34 N: 12.77 |
| 32 | 3-Cl-phenyl | 96 | ---do--- | 206–207 | C: 54.44 H: 2.28 N: 12.70 (441.30) | C: 54.34 H: 2.25 N: 12.53 |
| 33 | furyl | 79 | Yellowish, fine crystal powder (dimethylformamide). | 255–255.5 | C: 54.54 H: 2.29 N: 15.90 (352.33) | C: 54.30 H: 2.33 N: 15.70 |
| 34 | thienyl | 84 | Yellow, fine crystal powder (dimethylformamide) | 272.5–273 | C: 49.98 H: 2.10 N: 14.57 (384.47) | C: 49.98 H: 2.03 N: 14.59 |

EXAMPLE 2

10.5 parts of the hydrazine of the formula

(35)
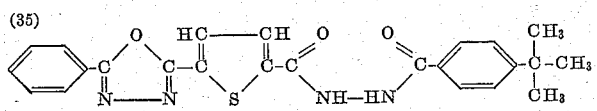

in 100 parts by volume of thionyl chloride are heated within 30 minutes to the boil while being stirred, and the batch is then refluxed for 3 to 4 hours. When hydrochloric acid is no longer being evolved the excess of thionyl chloride is removed by distillation under vacuum from the clear, pale-yellow reaction solution. The residue is mixed with 100 parts of alcohol and suctioned, to yield 9.2 parts (=91.5% of the theoretical yield) of the thiophene compound of the formula

(36)
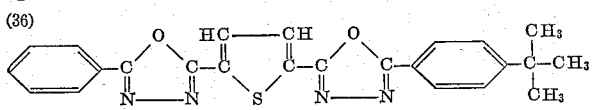

in the form of a light-yellow powder melting at 220 to 222° C. After three recrystallisations from dioxane with the aid of active carbon, there are obtained pale-yellow fine needles which display a strong greenish blue fluorescence in ultraviolet light and melt at 223–224° C.

*Analysis.*—$C_{24}H_{20}O_2N_4S$. (Molecular weight 428.51.) Calculated: C, 67.27; H, 4.70; N, 13.07. Found: C, 67.60; H, 4.83; N, 13.31.

The following Table II lists further oxdiazolyl-thiophene compounds which are accessible by the process described above.

The hydrazine of the Formula 35 used as starting material can be prepared in the following manner:

A mixture of 37.2 parts of thiophene-2:5-dicarboxylic acid monomethyl ester (prepared as described in Example VIIa of U.S. Patent No. 2,680,731 to E. I. du Pont de Nemours and Company, patented June 8, 1954), 250 parts by volume of chlorobenzene and 30 parts of thionyl chloride is stirred and heated for 1 hour to 115° C. and then further stirred for another hour at 115° C., whereupon thiophene-2:5-dicarboxylic acid monomethyl ester chloride forms and a complete solution is obtained. After having removed the excess of thionyl chloride by passing through dry air or by vacuum distillation, 27.2 parts of benzoic acid hydrazide and 250 parts by volume of chlorobenzene are added at 20° C. The reaction mixture is then heated in 1 to 1½ hours to the boil while being vigorously stirred and then refluxed for 6 to 12 hours, whereupon the colourless hydrazide of the formula

(37)
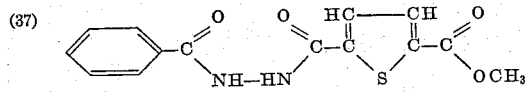

precipitates. When hydrochloric acid is no longer being evolved, 60 parts of thionyl chloride are dropped in within 30 minutes, and the reaction mixture is refluxed for 4 to 8 hours with exclusion of air. The excess thionyl chloride and the bulk of chlorobenzene are then distilled off the resulting clear reaction solution. During the following cooling to about 10° C., 250 parts by volume of methanol are added. The crystalline precipitate, the 5-[5'-phenyl-(1")-1':3':4'-oxdiazolyl-(2')]-thiophene-2-carboxylic acid methyl ester of the formula

(38)
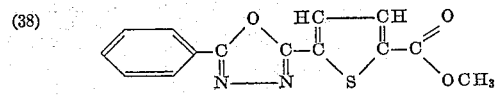

is suctioned off, washed with 250 parts by volume of methanol, and dried, to yield about 53.6 parts (=93.8% of the theoretical yield) of a pale-yellow crystalline powder melting at 161.5 to 162° C. After three recrystallisations from dioxane+water (4:1) with the aid of active carbon and fuller's earth, an almost colourless, fine crystalline powder is obtained which melts at 164–164.5° C.

*Analysis.*—$C_{14}H_{10}O_3N_2S$. (Molecular weight 286.31.) Calculated: C, 58.73; H, 3.52; N, 9.78. Found: C, 58.66; H, 3.75; N, 9.83.

28.6 parts of 5-[5'-phenyl-(1")-1':3':4'-oxdiazolyl-(2')]-thiophene-2-carboxylic acid methyl ester of the Formula 38 are dissolved with heating in 200 parts by volume of dioxane. 25 parts of hydrazine hydrate are added to the solution and the batch is stirred with reflux for 15 hours, whereupon 5-[5'-phenyl-(1")-1':3':4'-oxdiazolyl-(2')]-thiophene-2-carboxylic acid hydrazide of the formula

(39)
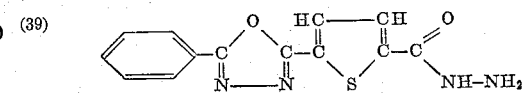

gradually settles out in the form of fine needles. The reaction mixture is diluted with 100 parts by volume of methanol, cooled to about 5° C., suctioned and the filter residue is rinsed with 120 parts by volume of methanol cooled to 5° C. After drying, there are obtained about 25.2 parts (=88% of the theoretical yield) of pale-yellow, fine needles melting at 228–229.5° C.

*Analysis.*—$C_{13}H_{10}O_2N_4S$. (Molecular weight 286.31.) Calculated: C, 54.54; H, 3.52; N, 19.57. Found: C, 54.51; H, 3.57; N, 19.27.

7.2 parts of 5-[5'-phenyl-(1")-1':3':4'-oxdiazolyl-(2')]thiophene-2-carboxylic acid hydrazide of the Formula 39 are stirred in 75 parts by volume of pyridine at room temperature. 5.4 parts of para-tertiary butylbenzoyl chloride are then dropped in within 45 minutes at 20 to 25° C.; the batch is stirred for another 45 minutes at this temperature, then heated within one hour to 85–90° C. and the yellow, slightly turbid reaction solution is stirred on for 3 hours at this temperature, then cooled to room temperature and stirred into 3000 parts of cold water. The precipitated reaction product is suctioned off, washed with cold water and then with hot water and dried. Yield: about 11 parts (=99% of the theoretical) of the hydrazine of the Formula 35 in the form of a pale-yellow powder which melts at 223 to 225° C.

*Table II*

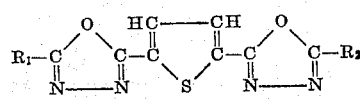

| No. | $R_1$ | $R_2$ | Yield in percent | Description | Melts at °C. | Analysis Calculated (mols) | Found |
|---|---|---|---|---|---|---|---|
| 40 | —⟨phenyl⟩— | —⟨phenyl⟩—$OCH_3$ | 97 | Pale-yellow, fine, felted needles (dioxane). | 249–250 | C: 62.68<br>H: 3.51<br>N: 13.92<br>(402.43) | C: 62.24.<br>H: 3.64.<br>N: 14.09. |
| 41 | —⟨phenyl⟩— | —⟨phenyl⟩—$O(CH_2)_7$—$CH_3$ | 84 | Almost colourless, very fine needles (methylenechloride ethanol). | 214–215 | C: 67.18<br>H: 5.64<br>N: 11.19<br>(500.62) | C: 66.77.<br>H: 5.70.<br>N: 11.09. |

Table II—Continued

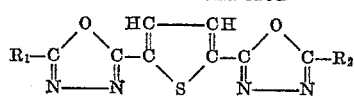

| No. | R₁ | R₂ | Yield in percent | Description | Melts at °C. | Analysis Calculated (mols) | Found |
|---|---|---|---|---|---|---|---|
| 42 | —⟨phenyl⟩—C(CH₃)₃ | —⟨phenyl⟩—OCH₃ | 93 | Pale-yellow, very fine needles (dioxane). | 268–269 | C: 65.49<br>H: 4.84<br>N: 12.22<br>(458.54) | C: 65.65.<br>H: 4.90.<br>N: 12.46. |
| 43 | —⟨phenyl⟩—C(CH₃)₃ | —⟨phenyl⟩—O(CH₂)₇—CH₃ | 92 | Pale yellow, shiny needles (dioxane). | 199 | C: 69.04<br>H: 6.52<br>N: 10.06<br>(556.73) | C: 69.07.<br>H: 6.60.<br>N: 10.02. |
| 44 | —⟨phenyl⟩—OCH₃ | —⟨phenyl⟩—O(CH₂)₇—CH₃ | 92 | Light-yellow, very fine crystals (dioxane). | 242–243 | C: 65.64<br>H: 5.70<br>N: 10.56<br>(530.65) | C: 65.50.<br>H: 5.72.<br>N: 10.67. |
| 45 | —⟨phenyl⟩ | thiophene-OCH₃ group | 88 | Light-yellow, very fine needles (dioxane). | 267–268 | C: 55.04<br>H: 2.77<br>N: 12.84<br>(436.47) | C: 54.76.<br>H: 2.77.<br>N: 12.83. |
| 46 | —⟨phenyl⟩—C(CH₃)₃ | thiophene-OCH₃ group | 82 | -----do----- | 280–281 | C: 58.52<br>H: 4.09<br>N: 11.37<br>(492.58) | C: 58.52.<br>H: 4.10.<br>N: 11.33. |
| 47 | —⟨phenyl⟩—OCH₃ | thiophene-OCH₃ group | 93 | Yellowish, fine, crystal powder (chlorobenzene). | 284 | C: 54.07<br>H: 3.03<br>N: 12.01<br>(466.49) | C: 54.28<br>H: 3.00<br>N: 11.93 |
| 48 | —⟨phenyl⟩ | thiophene-COOH group | 84.5 | Pale-yellow, very fine crystals dioxane). | 318–319 | C: 54.02<br>H: 2.39<br>N: 13.26<br>(422.44) | C: 53.80.<br>H: 2.39.<br>N: 13.23. |
| 49 | —⟨phenyl⟩—OCH₃ | thiophene-COOH group | 99 | Yellow, very fine needles (dimethylformamide). | 320–321 | C: 53.09<br>H: 2.67<br>N: 12.38<br>(452.47) | C: 53.32.<br>H: 2.47.<br>N: 12.47. |

EXAMPLE 3

100 parts of polyvinyl chloride, 54 parts of dioctylphthalate, 2 parts of titanium dioxide and 0.2 part of the thiophene compound of the Formula 27 are carefully mixed and rolled on a calender at 150 to 160° C. to form a foil.

The polyvinyl chloride foil obtained in this manner has a considerably higher white content than a foil that does not contain the thiophene compound.

EXAMPLE 4

100 parts of polyethylene are rolled on a heated calender to form a homogeneous foil. 0.2% of the thiophene compound of the Formula 26 and 0.5 part of titanium dioxide are then worked into this foil. The foil is pulled off the calender and then pressed between steel platens heated at 130 to 150° C. to produce a smooth surface on both sides.

The resulting opaque polyethylene foil has a higher white content than a foil that does not contain the thiophene compound.

EXAMPLE 5

10,000 parts of a polyamide in chip form, prepared in known manner from hexamethylenediamine adipate, are mixed with 30 parts of titanium dioxide (rutile modification) and 10 parts of the compound of the Formula 48 or 49 in a tumbler for 12 hours. The chips treated in this manner are then melted in a vessel heated with oil or diphenyl vapour to 300 to 310° C. (after having displaced the atmospheric oxygen with superheated steam) and stirred for ½ hour. The melt is then expressed under a nitrogen pressure of 5 atmospheres (gauge) through a spinning nozzle and the resulting filament is cooled and wound on a spinning bobbin. The resulting filaments have an excellent brightening effect which is stable towards heat-setting and has good fastness to washing and light.

EXAMPLE 6

A melt of 100 parts of polyester (polyterephthalic acid ethyleneglycol ester) and 0.1 part of the compound of the Formula 43 or 44 is expressed in tape form through a nozzle. The polyester tape obtained in this manner has a substantially higher white content than a tape that does not contain the thiophene compound.

What we claim is:
1. A compound of the formula

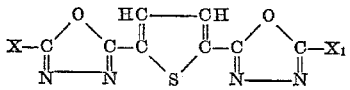

wherein X and X₁ each represents a member selected from the group consisting of (1) 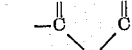

(2) 

(3) 

(4) 

and (5) 

wherein $Y_1$ is a member selected from the group consisting of hydrogen, chlorine, alkyl and alkoxy, and $Y_2$ is a member selected from the group consisting of hydrogen, chlorine and alkyl.

2. The compound of the formula

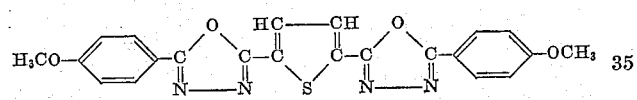

3. The compound of the formula

4. The compound of the formula

5. The compound of the formula

References Cited by the Examiner
UNITED STATES PATENTS

| | | | |
|---|---|---|---|
| 2,689,855 | 9/54 | Wagner | 260—329 |
| 2,765,304 | 10/56 | Siegrist et al. | 260—307 |
| 2,791,563 | 5/57 | Huey | 252—301.2 |
| 3,005,779 | 10/61 | Ackermann et al. | 252—301.2 |
| 3,065,238 | 11/62 | Weidinger et al. | 260—307 |
| 3,098,848 | 7/63 | Braus et al. | 260—329 |

FOREIGN PATENTS

| | | |
|---|---|---|
| 196,343 | 3/58 | Austria. |
| 835,891 | 5/60 | Great Britain. |

OTHER REFERENCES

Richter's Organic Chemistry, vol. IV (New York, 1947), pages 14–15.

NICHOLAS S. RIZZO, *Primary Examiner.*

M. A. BRINDISI, WALTER A. MODANCE, *Examiners.*